United States Patent [19]

Banks

[11] 4,032,556
[45] June 28, 1977

[54] METHANATION OF GASES

[75] Inventor: Reginald George Sinclair Banks, Solihull, England

[73] Assignee: The Gas Council, London, England

[22] Filed: Nov. 13, 1974

[21] Appl. No.: 523,410

Related U.S. Application Data

[63] Continuation of Ser. No. 307,141, Nov. 16, 1972, abandoned.

[30] Foreign Application Priority Data

Nov. 23, 1971 United Kingdom ............. 54823/71
July 12, 1972 United Kingdom ............. 32599/72

[52] U.S. Cl. .................. 260/449 M; 260/449.6 M
[51] Int. Cl.$^2$ ..................................... C07C 27/06
[58] Field of Search ............... 260/449.6 M, 449 M

[56] References Cited

UNITED STATES PATENTS

| | | | |
|---|---|---|---|
| 3,387,942 | 6/1968 | Habermehl et al. | 252/374 |
| 3,511,624 | 5/1970 | Humphries et al. | 260/449 S |
| 3,642,460 | 2/1972 | Thompson | 260/449.6 M |
| 3,709,669 | 1/1973 | Marion et al. | 260/449 M |

*Primary Examiner*—James D. Thomas, Jr.
*Assistant Examiner*—A. Siegel
*Attorney, Agent, or Firm*—Larson, Taylor and Hinds

[57] ABSTRACT

A process is provided whereby carbon oxides and hydrogen in a gaseous mixture that also contains hydrocarbons are caused to react over a catalyst with the production of methane in such manner that any ethane present in the reactants is virtually unaffected by the methanation reactions.

The catalyst may comprise nickel or colbalt associated with alumina, silica, magnesia, chromia or urania, or mixtures thereof.

The process may be operated, in relation to the catalyst, within a range of temperatures and pressures such that hydrogenation of the carbon oxides present in the gas is substantially completed at an upper temperature limit while ethane present in the gas remains substantially unreacted at the said upper limit.

2 Claims, No Drawings

METHANATION OF GASES

This is a continuation of application Ser. No. 307,141 filed Nov. 16, 1972 now abandoned.

BACKGROUND OF THE INVENTION

This invention is concerned with the production of a substitute natural gas derived from carbonaceous feedstocks, in particular crude petroleum or distillate fractions produced therefrom, but which may also be residual oil fractions and other hydrocarbons. Normally when the feedstock is hydrogenated at an elevated temperature with commercially-produced hydrogenating gas, to which steam may or may not be added, the resulting gaseous mixture normally contains, beside hydrocarbons, carbon oxides and untreated hydrogen which detract from the reaction products being ideally suitable as a substitute for natural gas.

SUMMARY OF THE INVENTION

According to the present invention there is provided a process whereby carbon oxides and hydrogen in a gaseous mixture that also contains hydrocarbons are caused to react over a catalyst with the production of methane in such a manner that any ethane present in the reactants is virtually unaffected by the methanation reactions.

The catalyst may comprise nickel or cobalt associated with alumina, silica, magnesia, chromia or urania, or mixtures thereof.

The process may be operated, in relation to the catalyst, within a range of temperatures and pressures such that hydrogenation of the carbon oxides present in the gas is substantially completed at an upper temperature limit whilst ethane present in the gas remains substantiallly unreacted at the said upper limit.

This process is of value as a means of improving the compatability of such a gas with natural gas, since it enables the calorific value to be raised and, in virtue of lowering the hydrogen concentration, produce a gas of lower flame speed. The flame speed is conveniently qualified in terms of the Weaver flame speed factor, a function of the gas composition, which expresses a maximum flame speed of a gas in air as a percentage of the maximum flame speed of hydrogen in air (see Gilbert and Prigg, Trans. Inst. Gas Eng., 1956–7, 106, 530–575).

DESCRIPTION OF THE PREFERRED EMBODIMENT

In order to further illustrate the invention by way of example, various catalysts were prepared and tested using a gas composition typically representative of the type of reaction product than can be obtained by the hydrogenation of a petroleum oil.

I. Nickel silica catlyst a. Catalyst preparation

The catalyst comprised in nickel silica mixture and was prepared as follows:

1114 grams nickel nitrate hexahydrate were dissolved in 2 liters of distilled water and to the cold solution 132.7 mls of waterglass (laboratory quality sodium silicate) was added with stirring. Some of the nickel was then precipitated. The mixture was heated to 60°–70° C and maintained thus while sufficient initially cold potassium carbonate solution (60 $K_2CO_3$: 100 $H_2O$ by weight) to precipitae the rest of the nickel was added slowly, with stirring, care being taken to control frothing due to carbon dioxide liberation.

The precipitate was then filtered and washed with 1500 ml. batches of distilled water by re-slurrying at 60°–70° C until the washings were neutral. (Sodium carbonate solution (40 $Na_2CO_3$: 100 $H_2O$ by weight) may be used if desired as an alternative precipitant).

The precipitate was dried overnight at 120° C and then calcined for 4 hours at 450° C. The dry material was crushed to below 25 B.S.S. and with the addition of 2 percent of graphite pelleted to ⅛ in. cylinders.

A typical gas composition was prepared to represent the type of reaction productions that could be obtained by the hydrogenation of a petroleum oil.

The analysis of the gas on a volume basis was as follows:

| | |
|---|---|
| Hydrogen | 27.5% |
| Methane | 55.4% |
| Ethane | 13.1% |
| Carbon Monoxide | 0.9% |
| Carbon dioxide | 3.1% |

This gas was passed at an initial temperature of 150° over a bed of a nickel-silica catalyst at a pressure of 420 p.s.i.g. and a space velocity of 5100 standard volumes per volumes of catalyst space per hour. Hydrogenation of carbon oxides took place and a temperature rise was observed. The initial temperature was gradually raised and when it had reached 180° C the temperature rise was 70° C and the outlet gas composition on the volume basis was observed to be as follows:

| | |
|---|---|
| Hydrogen | 13.2% |
| Methane | 70.9% |
| Ethane | 15.8% |
| Carbon monoxide | Not detectable |
| Carbon dioxide | 0.1% |

In the experiment described above, the calorific values of the gases before and after the low temperature hydrogenation were 931 and 1095 Btu/ft$^3$ respectively. Hence not only is the invention important for maintaining the ethane content of the gas during hydrogenation but the resulting gaseous product is very valuable as a substitute for natural high methane content gases.

II. Nickel-alumina-silica catalyst a. Catalyst preparation

The catalyst was prepared by precipitating nickel and aluminium nitrates with alkaline sodium silicate. 1113.9 g. of nickel nitrate and 138.0 g. of aluminum nitrate were dissolved in 6. 1 of cold distilled water; 627.8 g. of anhydrous sodium carbonate and 99.5 mls. of waterglass solution (560 g. of $SiO_2$ per liter) were dissolved in 4 l. of cold distilled water. The alkaline silicate solution was slowly added, with stirring, to the cold nitrate solution. The resulting precipitate was recovered by filtration and was washed, dried and calcined at 350° C. The product, before reduction, contained Ni, 58.8; $Al_2O_3$, 6.7; $SiO_2$: 8.8; Na, 0.33, percent be weight.

b. Experiment with the catalyst

In an experiment at 420 psig a gas of composition $CH_4$, 56; $C_2H_6$, 11; $H_2$, 30; CO, 1; $CO_2$, 2, percent by volume was passed at a space velocity of 5100 standard volumes of gas per volume of catalyst space per hour at a low but gradually increasing catalyst temperature. Initiation of carbon dioxide methaniation was observed when the inlet temperature had reached 410° C. When the inlet temperature has risen to 196° C the outlet gas composition was observed to be CH$_4$, 66; C$_2$H$_6$, 12; H$_2$, 22, percent by volume the carbon dioxide having been completely hydrogenated to methane; within experimental error this composition is compatible with the ethane having escaped hydrogenation. When then the inlet temperature was raised materially above 200° C, hydrogenation of ethane begain to be detectable.

The calorific value and Weaver flame speed factors of the inlet and outlet gases were

|  | Inlet | Outlet |
|---|---|---|
| Calorific value, Btu/cu.ft. | 908 | 1003 |
| Weaver flame speed factor | 24.0 | 21.2 |

III. Nickel-magnesia catalyst a. Catalyst preparation

The catalyst was prepared by co-precipitating nickel and magnesium nitrates with sodium hydroxide. 185.7 g. of nickel nitrate and 79.5 g. of magnesium nitrate were dissolved in 1 liter of distilled water and the solution was brough to the boil. To the hot solution was added a cold solution of 85 g. of sodium hydroxide in 0.5 liters of water. The precipitate was filtered off and washed four times with warm water. It was dried at 110° C and calcined at 450° C. The product has a nickel content of 57 percent and a sodium content of 0.04 percent by weight.

b. Experiment with the catalyst:

An experiment was performed as described under I(b) above, at the same space velocity, but at a pressure of 750 psig. The corresponding observations that were made were:

Inlet catalyst temperature a which hydrogenation of carbon dioxide was first observed 190° C Inlet and outlet gas compositions, caloric values and Weaver flame speed factors at an inlet temperature of 210° C:

|  | Inlet | Outlet |
|---|---|---|
| Gas compositions, per cent by volume |  |  |
| CH$_4$ | 57 | 67 |
| C$_2$H$_6$ | 11 | 13 |
| H$_2$ | 29 | 20 |
| CO | 1 | 0 |
| CO$_2$ | 2 | 0 |
| Calorific value, Btu/cu.ft. | 915 | 1025 |
| Weaver flame speed factor | 23.5 | 20.5 |
| Inlet catalyst temperature above which ethane hydrogenation was detectable |  | 240° C |

IV. Nickel-chromia catlyst a. Catalyst preparation

The catalyst was prepared by co-precipitating nickel and chromium nitrates with sodium carbonate. 120 g. of nickel nitrate and 160 g. of chromium nitrate were dissolved in 2 liters of distilled water. The solution was heated at 80° C and cold saturated aqueous sodium carbonate was added with stirring to the solution until it became alkaline (pH 8–9). The precipitate was filtered off, washed six times with warm water, dried at 80° C and calcined at 450° C. The resulting product had the nickel content of 34.5 percent by weight, a chromium content of 30.3 percent and a sodium content of 0.06 percent.

b. Experiment with the catalyst

An experiment was performed exactly as described under I(b) above, at the same space velocity but at a pressure of 750 psig. Corresponding observations that were made were:

Inlet catalyst temperature at which hydrogenation of carbon dioxide was first observed 150° C Inlet and outlet gas compositions, calorific values and Weaver flame speed factors at an inlet temperature of 224° C:

|  | Inlet | Outlet |
|---|---|---|
| Gas compositions, per cent by volume: |  |  |
| CH$_4$ | 57 | 67 |
| C$_2$H$_6$ | 11 | 13 |
| H$_2$ | 29 | 20 |
| CO | 1 | 0 |
| CO$_2$ | 2 | 0 |
|  | 100.0 | 100.0 |
| Calorific value, Btu/cu.ft. | 915 | 1025 |
| Weaver flame speed factor | 23.8 | 20.5 |
| Inlet catalyst temperature above which ethane hydrogenation was detectable |  | 250° C |

V. Cobalt-silica catalyst a. Catalyst preparation

This catalyst was prepared by precipitating cobalt nitrate with sodium silicate and sodium carbonate 372 g. of cobalt nitrate was dissolved in 2 liters of distilled water and the solution heated to 75° C. To the hot solution a cold solution of 45 mls. of waterglass (560 g. of SiO$_2$ per liter) in 400 mls. of water was slowly added with stirring. The resulting slurry was reheated to 75° C and cold saturated aqueous sodium carbonate added till the solution became alkaline (pH 8–9). The catalyst was filtered off, washed six times with warm water, dried at 80° C and calcined. The product has a cobalt content of 53.9 percent by weight and a sodium content of 0.02 percent.

b. Experiment with the catalyst

An experiment was performed as described under I(b) above, at the same pressure and space velocity. The corresponding observations that were made were as follows:

Inlet catalyst temperature at which hydrogenation of carbon dioxide was first observed - 150° C Inlet and outlet gas composition, calorific values and Weaver flame speed factors at an inlet temperature of - 220° C

|  | Inlet | Outlet |
|---|---|---|
| Gas composition, per cent by volume: |  |  |
| CH$_4$ | 57 | 61 |
| C$_2$H$_6$ | 11 | 13 |
| H$_2$ | 29 | 25 |
| CO | 1 | — |
| CO$_2$ | 2 | 1 |
| Calorific value, Btu/cu.ft. | 915 | 980 |
| Weaver flame speed factor | 23.8 | 22.2 |
| Inlet catalyst temperature above which ethane hydrogenation was |  |  |

|  | Inlet | Outlet |
|---|---|---|
| detectable: |  | 270° C |

At the comparatively low temperature, relative to the ethane decomposition threshold, at which the gas analysed was sampled, it will be noted that carbon dioxide hydrogenation was not, in this instance, complete.

VI. Nickel-urania-alumina catalyst a. Catalyst composition and preparation

This catalyst had the nominal composition by weight: 15 percent nickel, 10 percent uranium, 0.5 percent potassium, the remainder - alumina. It was prepared by impregnation according to our British Patent Specification No. 1039206, 1196411, and 1196412 or 1256697, and briefly comprises impregnating an alumina support in an acetic acid solution of nickel and uranyl nitrates and potassium acetate. After soaking, the supports are drained and fired at 500° C for 3 hours in a stream of air. The process is repeated until the final composition is 15 percent nickel, 10 percent uranium, and 0.5 percent potassium by weight.

b. Experiment with the catalyst

An experiment as described under I(b) above, at the same procedure and space velocity. The corresponding observations that were made as follows:

Inlet catalyst temperature at which hydrogenation of carbon dioxide was first observed 260° C Inlet and outlet gas compositions, calorific values and Weaver flame speed factors at an inlet temperature of - 272° C

|  | Inlet | Outlet |
|---|---|---|
| Gas compositions, per cent by volume |  |  |
| $CH_4$ | 57 | 67 |
| $C_2H_6$ | 11 | 13 |
| $H_2$ | 29 | 20 |
| CO | 1 | — |
| $CO_2$ | 2 | — |
| Calorific value, Btu/cu.ft. | 915 | 1025 |
| Weaver flame speed factor | 23.8 | 20.5 |
| Inlet catalyst temperature above which ethane hydrogenation was detectable- |  | 310° C |

In each of the experiments reported, the gas composition corresponded, within the experimental error, while the ethane quantitatively escaping hydrogenation.

With two exceptions, each of the catalysts discussed was used in an experiment at each of the two pressures reported, 750 and 420 psig. The inlet catalyst temperature at which hydrogenation of carbon oxides and of ethane was first observed to proceed at a significant rate at the standard space velocity of 5100 standard volume of inlet gas per volume of catalyst space per hour were:

|  | Temperature for carbon dioxide °C | Temperature for ethane °C |
|---|---|---|
| at 750 psig |  |  |
| Nickel-alumina-silica | 150 | 230 |
| Nickel-magnesia | 190 | 240 |
| Nickel-chromia | 150 | 250 |
| Cobalt Silica | 170 | 330 |
| at 420 psig |  |  |
| Nickel-silica | 150 | 180 |
| Nickel-alumina-silica | 140 | 200 |
| Nickel-magnesia | 175 | 220 |
| Nickel-chromia | 160 | 240 |
| Cobalt-silica | 190 | 270 |
| Nickel-urania-alumina | 260 | 310 |

As illustrated by the detailed examples given, these temperatures differences were sufficient to ensure that for each catalyst and set for operating conditions there was a range of operating temperatures at which carbon oxide hydrogenation was substantially complete while the ethane passed through the catalyst bed substantially unchanged.

It will be noted that throughout the examples, the initiation temperature that is given for carbon oxides is that for carbon dioxide. This is the less reactive of the two oxides, and the hydrogenation of carbon monoxide was always observed at a lower temperature.

It should also be noted that in the experiments the inlet gases were always dry. The outlet gases necessarily contained steam, but the reported compositions are on the dry basis.

We claim:

1. A method for the production of a fuel gas by methanation of a gas comprising contacting a gas produced by the hydrogenation of liquid hydrocarbon feedstocks with a hydrogenation gas at high temperature, said gas containing methane, ethane, carbon monoxide, carbon dioxide, and hydrogen, with a hydrogenation catalyst selected from the group consisting of nickel-alumina-silica, nickel magnesia, nickel-chromia, nickel-urania-alumina, nickel silica and cobalt silica at elevated pressure and at an elevated temperature such that hydrogenation of carbon oxides present in the reactants is substantially complete at a temperature below that necessary for the hydrogenation of ethane.

2. A method according to claim 1 wherein said catalyst is a nickel-chromia hydrogenation catalyst.

* * * * *